J. R. ROE.
WEED DESTROYING MACHINE.
APPLICATION FILED APR. 9, 1913.

1,073,780.

Patented Sept. 23, 1913.

Witnesses
Robert M. Sutphen
A. L. Hind

Inventor
J. R. Roe

By Watson E. Coleman
Attorney

UNITED STATES PATENT OFFICE.

JOHN R. ROE, OF RUPERT, IDAHO.

WEED-DESTROYING MACHINE.

1,073,780.  Specification of Letters Patent.  Patented Sept. 23, 1913.

Application filed April 9, 1913. Serial No. 760,066.

*To all whom it may concern:*

Be it known that I, JOHN R. ROE, citizen of the United States, residing at Rupert, in the county of Minidoka and State of Idaho, have invented certain new and useful Improvements in Weed-Destroying Machines, of which the following is a specification, reference being had to the accompanying drawings.

This invention relates to an improved machine for destroying weeds, sage brush and the like, and has for one of its objects to provide a device of this character which is of simple and durable construction and will effectually destroy all weeds and like growths.

Another object of the invention resides in the provision of a frame of V-shaped form in plan, a continuous metal wear plate secured to the side walls of the frame at their lower edges and provided with a widened intermediate portion forming a nose piece and a plurality of cutting knives fixed to said wear plate.

For a full understanding of the invention, reference is to be had to the following description and accompanying drawings, in which—

Figure 1:
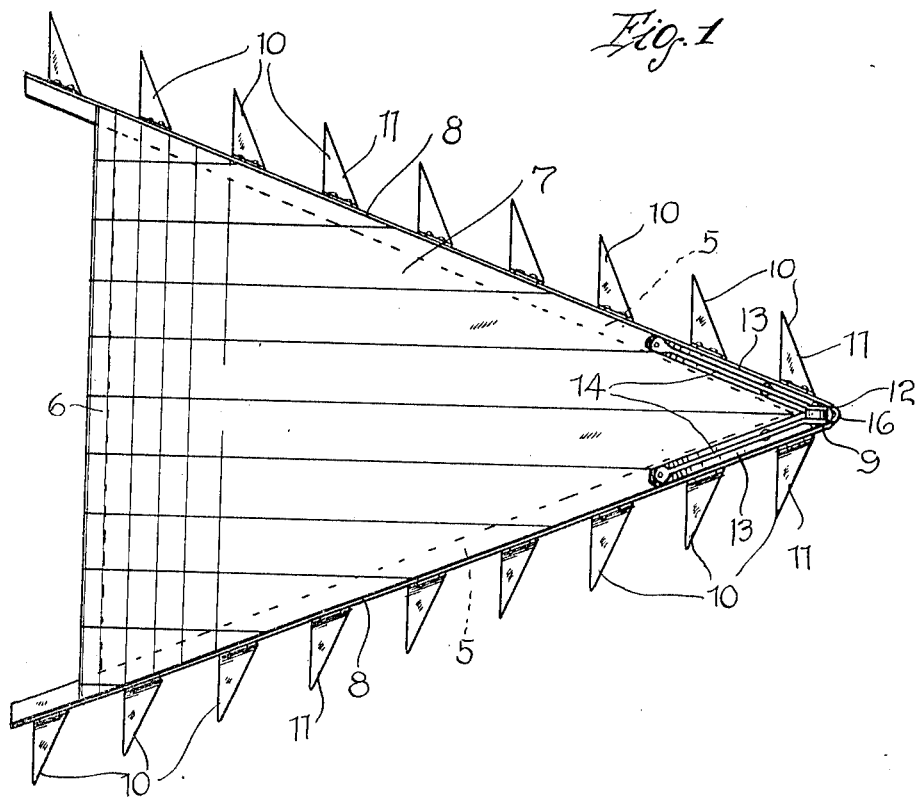
Figure 2:
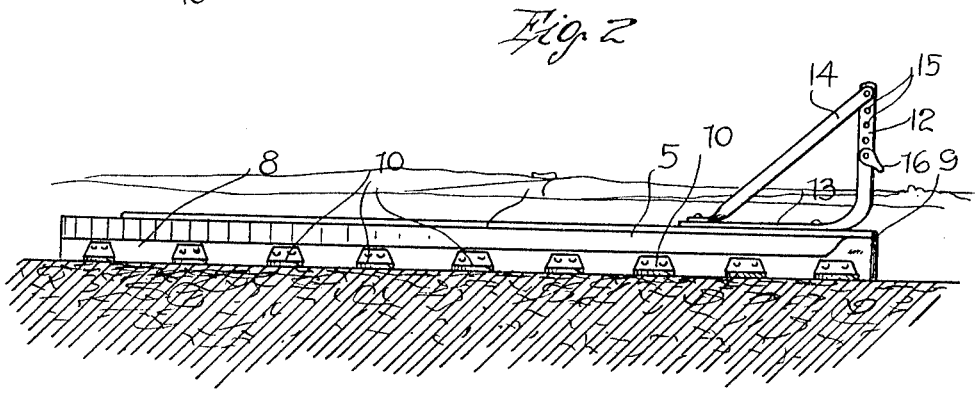

Figure 1 is a top plan view of a weed destroying machine embodying the present invention. Fig. 2 is a side elevation thereof.

Referring in detail to the drawings, 5 designates the diverging longitudinal side bars of a frame which are preferably connected at their rear ends by means of the bars 6. Upon these frame bars, the platform 7 is secured, whereby a body structure of great strength and stability is produced. To the lower edges of the side bars 5 of the frame, and upon the outer surfaces thereof, the strap iron indicated at 8 is secured. At the meeting ends of these side bars 5, the same are covered and protected by a sheet metal nose piece 9. To the strap irons 8, the cutting knives 10 are riveted, bolted or otherwise rigidly fixed. Any desired number of these knives may be employed, the same being arranged in spaced relation and extending transversely from the frame. The cutting edges of said knives are preferably inclined rearwardly as shown at 11. Upon the forward ends of the frame bars 5, the standard 12 is secured, said standard being provided upon its lower end with the diverging arms 13 which are bolted to the frame. Brace bars 14 are also secured to these arms and to the upper end of the standard 12. This standard is provided with a plurality of spaced openings 15 to any one of which a clevis indicated at 16 may be attached. To this clevis, suitable draft attachments, (not shown) are adapted to be connected.

In the use of my machine, the horses or other draft animals are connected to the standard 12. As the machine is drawn over the ground, the knives 11 which are disposed contiguous to the surface thereof are brought into contact with the stalks of the weeds or sage brush so that the same are severed at their roots. As the two series of spaced knife blades extend in divergent relation from the front to the rear of the frame, it will be obvious that a wide swath may be cut so that the ground surface will be quickly cleared.

From the foregoing, it is believed that the construction and manner of operation of the invention will be clearly and fully understood. The same is comparatively simple, extremely strong and durable in construction and may be produced at small manufacturing cost. It is also highly efficient in practical operation.

While I have shown and described the preferred construction and arrangement of the several elements, it will be understood that the invention is susceptible of considerable modification without departing from the essential features or sacrificing any of the advantages thereof.

Having thus described the invention, what is claimed is:

1. A machine of the character described comprising a frame of substantially V-shaped form in plan including diverging side walls and a platform connecting the same, a continuous metal wear plate extending along the lower edges of said side walls and secured to the same, said wear plate having a widened intermediate portion engaged upon said side walls at their connected ends and constituting a nose piece, and a plurality of spaced laterally extending cutting knives secured to said wear plate and projecting from each side of said frame.

2. A machine of the character described comprising diverging side walls, a platform secured to and connecting said side walls, a plurality of spaced cutting knives secured to each of the side walls adjacent its lower edge, a standard mounted upon the forward meeting ends of said side walls and provided with diverging base arms secured to the respective side walls, and obliquely disposed brace bars fixed to said arms and to the upper end of the standard.

In testimony whereof I hereunto affix my signature in the presence of two witnesses.

JOHN R. ROE.

Witnesses:
  E. R. DAMPIER,
  C. C. NELSON.

---

Copies of this patent may be obtained for five cents each, by addressing the "Commissioner of Patents, Washington, D. C."